Sept. 30, 1969     C. A. DAMM ET AL     3,469,872
LOW PROFILE LOAD-RELEASING LOCK-ON COUPLING
Filed Nov. 9, 1967     2 Sheets-Sheet 1

INVENTORS
CARL A. DAMM
ALBERT C. EICHMANN
BY
ATTORNEYS

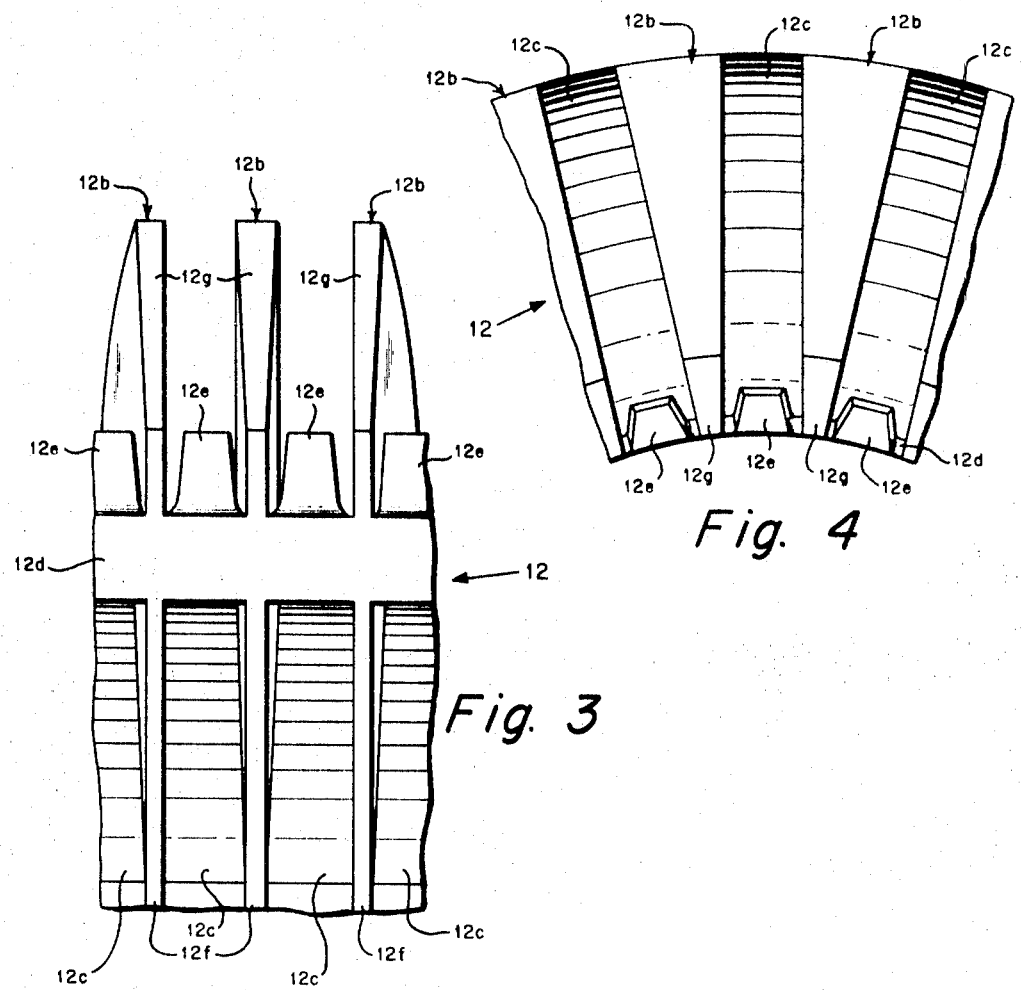
Fig. 3
Fig. 4
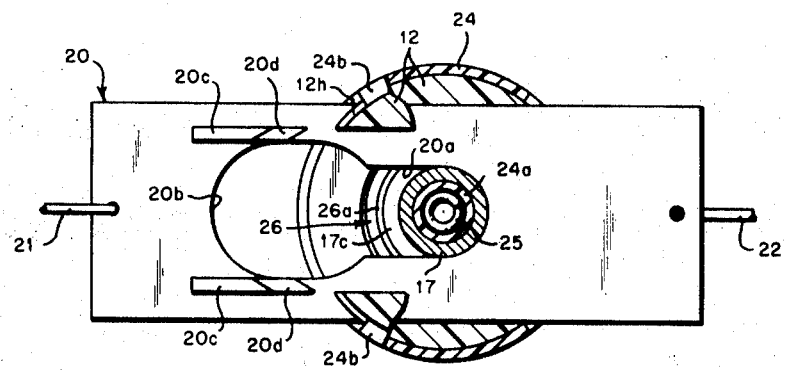
Fig. 5
INVENTORS
CARL A. DAMM
ALBERT C. EICHMANN
BY
ATTORNEYS

United States Patent Office 3,469,872
Patented Sept. 30, 1969

3,469,872
LOW PROFILE LOAD-RELEASING LOCK-ON COUPLING
Carl A. Damm, Upper Black Eddy, and Albert Carl Eichmann, Huntingdon Valley, Pa., assignors to the United States of America as represented by the Secretary of the Navy
Filed Nov. 9, 1967, Ser. No. 681,724
Int. Cl. F16b 7/00; F16d 1/00; F16l 21/00
U.S. Cl. 287—119         13 Claims

ABSTRACT OF THE DISCLOSURE

A releasable coupling for attachment to a grooved lock-on stud including a plastic sprag cage member having an annularly arranged plurality of projections defining semicircular recesses in one end thereof disposed about a fluted coaxial bore for slidingly receiving a corresponding plurality of semicircular sprag elements confined for rotation within respective recesses by a cap member, the cage member further including integrally formed therewith a ring disposed generally along the annular axis of rotation of the sprag elements and having projecting therefrom spring fingers which normally tend to urge respective sprag elements to rotate to a stud receiving position. The coupling further includes a spring-loaded sear plate movable transversely of the bore of the coupling having an aperture for locking a sprag engaging plunger in a position wherein the stud is engaged by the sprags and a pair of cam surfaces positioned adjacent the aperture for camming the plunger to cause release of the stud.

---

The invention described herein may be manufactured and used by or for the Government of the United States of America for governmental purposes without the payment of any royalties thereon or therefor.

Background of invention

The load releasing lock-on coupling disclosed by Eichmann in U.S. Patent No. 3,043,614, issued July 10, 1962, is somewhat expensive to fabricate in that precise machining of its elements are required and in that skilled labor is required for its assembly. Heretofore, it has been felt necessary in practice to provide a unitary annular assembly of sprag elements bonded together with polyurethane. The process of forming the annular sprag assembly is expensive; and easily effected failure of the polyurethane binder causes failure of the coupling. Additionally, the previously known lock-on coupling includes a coaxially aligned, depressable plunger member for actuating release of the coupling which member necessarily limits the variety of applications in which the coupling may be used. Consequently, the coupling is unusable under conditions where less than the necessary clearance is available as in certain types of bomb racks and weapon skids.

Summary of invention

It is the general purpose of this invention to provide an improved releasable lock-on coupling which may be more easily made at lower cost by unskilled labor and which avoids both the necessity for including a polyurethane sprag element binder and other disadvantages noted above. The general purpose and other objects which may hereinafter become apparent may be accomplished providing a cage member having an annularly arranged plurality of projections defining recesses formed for slidingly receiving the sprag elements and including an integrally formed ring which is positioned adjacent the annular axis of the sprag element assembly and which has a plurality of spring fingers which normally urge rotation of the sprag elements to a stud-receiving position. The invention additionally comprehends the inclusion of a transversely movable, apertured sear plate which is adapted for engaging a sprag assembly actuating plunger in a lock position and which includes camming surfaces for moving the plunger to permit releasing the lock-on stud.

Brief description of drawing

FIG. 3 represents an enlarged fragmentary view in elevation of a sprag cage member of the apparatus of FIG. 1 with the sprag elements removed;

FIG. 4 represents an enlarged fragmentary view in plan of the sprag cage member of the apparatus of FIG. 1 with the sprag elements removed; and FIG. 5 represents a view in plan of the coupling with portions broken away and taken generally along line 5—5 of FIG. 2.

Description of preferred embodiment

Figure 2:
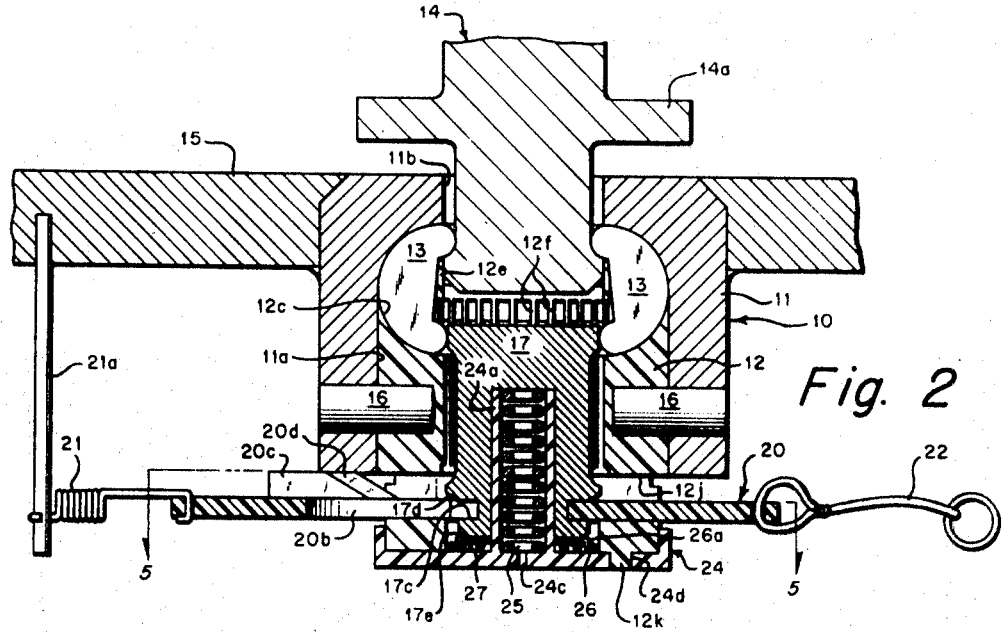
FIG. 2 represents a view in elevation and partially in cross section of the coupling of FIG. 1 in stud engaging position.
Figure 1:
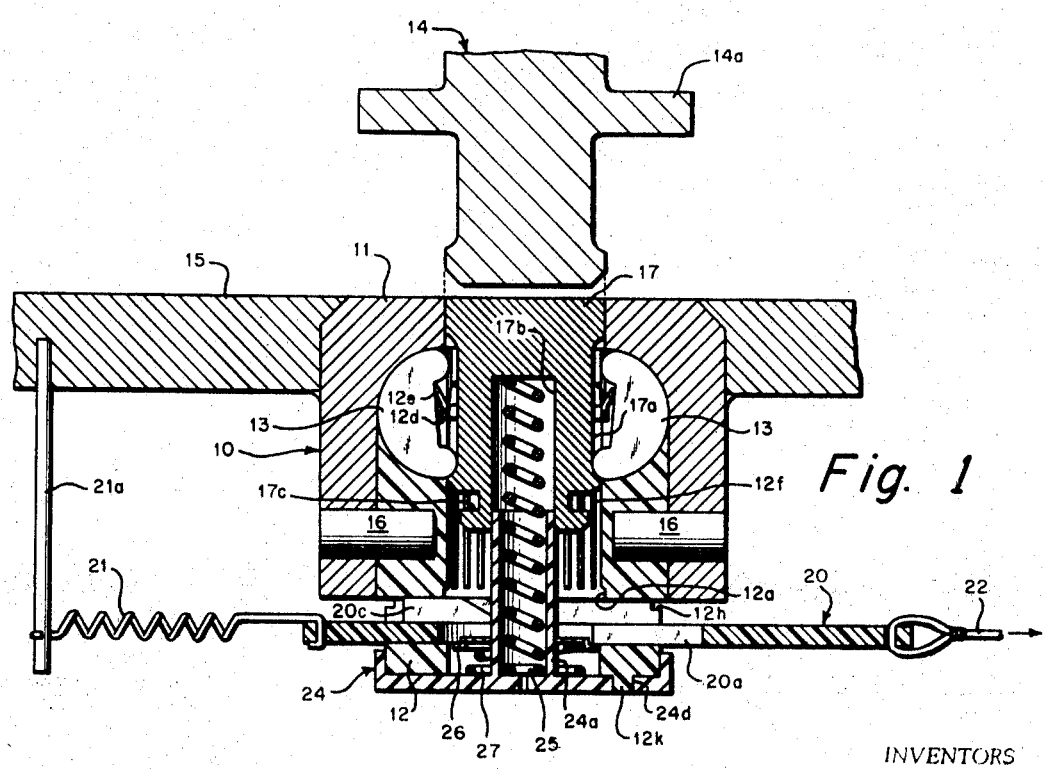
FIG. 1 represents a view in elevation and partially in cross section of a coupling according to the invention in stud disengaging position.

Referring now to FIGS. 1 and 2, the coupling, generally designated at 10, includes a cylindrical cap member 11 having a coaxial bore 11a extending thereinto and terminating in a smaller diametered, coaxial, stud-receiving aperture 11b. The bore 11a is sized to contiguously receive a generally cylindrical sprag cage member 12 having a coaxial bore 12a extending therethrough, the member 12 being formed for slidingly receiving a plurality of rotatable, planar, semicircular sprag elements 13 which have opposed lip portions and which are more particularly described in the above-indicated patent to Eichmann. The interior terminus of the bore 11a is concavely curved so that the outer peripheries of the semicircular sprags 13 are in contiguous sliding contact therewith during their rotations between positions for engaging or disengaging a peripherally-grooved lock-on stud 14. The cap 11 is suitably connected as by welding or by threads to an apertured base 15 which may be a portion of the frame of a load-supporting device or which may be connected to a store. The cage member 12 is connected in its position within the cap 11 by spring pins 16. The coupling 10 further includes a cylindrical plunger 17 which has an elongated annular groove 17a extending about its periphery adjacent one end thereof and which is arranged for reciprocable movement along the bore 12a of the member 12.

More particularly, referring to FIGS. 3 and 4, the end of the cage member 12 adjacent the aperture 11b terminates in a plurality of spaced apart projections 12b which are annularly arranged about the bore 12a and extend generally longitudinally of the bore 12a and radially of its axis. The outer lateral periphery of each of the projections 12b is circularly curved and conforms to the shapes of both the body portions of the sprag elements 13 and the concavely curved terminus of the bore 11a. Confronting parallel planar surfaces of adjacent projections 12b and the concave, circularly curved intervening surface 12c of the member 12 define a semicircular recess adapted for slidingly receiving in contiguous relationship a respective sprag element 13 which is rotatable about an annular axis of the annular arrangement of the elements 13. The sprags 13 are thereby arranged for sliding rotation to engage or to release the grooved lock-on stud 14, as shown in FIGS. 2 and 1. As is more clearly shown in FIGS. 3 and 4, an integrally formed ring 12d is connected to the inner lateral peripheries of the projections 12b adjacent and in the plane of the annular axis of the arrangement of sprag elements 13 and imparts dimensional stability to the arrangement of projections 12b. A plurality of cantilevered spring fingers 12e project from the ring 12d in registration with respective ones of the recesses and diverge outwardly of the axis of the member 12. The function of the spring fingers 12e is to normally urge the sprag elements 13 to be rotated to the disengage position shown in FIG. 1 so that the sprag assembly is arranged to receive or release the lock-on stud 14. The inner lateral peripheries of the projections 12b generally extend inwardly of the bore 12a and longitudinally away from the aperture 11b beyond the curved surface 12 for forming fluted portions 12f which define along with the ring 12d bearing surfaces for the reciprocable plunger 17. The ends of the inner lateral peripheries of the projections 12b beyond the ring 12d and adjacent the cap aperture 11b diverge outwardly of the axis of the bore 12a as at 12g to facilitate insertion of the lock-on stud 14 into the annular sprag arrangement, to protect the spring fingers 12e and to alleviate flashing problems in injection molded cage members 12. The cage member 12 also includes an annular groove 12h formed in its periphery in spaced relation to the assembly of sprags 13 which is divided into two segments by a keyway 12j extending transversely across the bore 12a and having a cross-sectional configuration approximating a pair of juxtaposed, differently sized rectangles, the smaller of which is positioned closer to the sprag assembly. A rectangular sear plate 20, hereinafter more particularly described, is positioned for sliding reciprocatory movement within the keyway 12j.

The plunger 17 includes a coaxial bore 17b which extends thereinto toward the sprag adjacent end thereof. Additionally, a second annular groove 17c bounded on the sprag adjacent side by a chamfered shoulder 17d is formed in the lateral periphery of the plunger 17 adjacent its other end which terminates in a chamfered tip portion 17e of somewhat smaller diameter than that of the sprag adjacent end of the plunger 17.

One end of the sear plate 20 is attached as by a tensioned spring 21 and a post 21a to the base structure 15; and the other end is attached to a lanyard 22 for actuating release. In order to lock the plunger 17 in the position of FIG. 2 wherein the lock-on stud 14 is engaged and retained by the sprag elements 13, the plate 20 includes formed therein a pair of contiguous apertures 20a and 20b, the smaller of which 20a is positioned adjacent the lanyard connected end of the plate 20. The aperture 20a is sized for interlocking engagement with the groove 17c of the plunger 17 and opens up into a larger aperture 20b which is sized to permit reciprocatory ingress and egress of the chamfered plunger tip 17e. The plate 20 has a pair of cams 20c integrally formed therewith on both sides of the aperture 20b. The cams 20c have inclined camming surfaces 20d which, under pulling action by the lanyard 22, cam the chamfered shoulder 17d of the plunger 17 toward the sprag assembly so that rotation of the innermost lip portions of the sprags 13 into the elongated groove 17a is permitted whereby the lock-on stud 14 may be withdrawn from the coupling. The plate 20 is, of course, simultaneously withdrawn from locking engagement of the groove 17c of the plunger 17.

The coupling 10 further includes a flanged end cap 24 of generally circular configuration having a tubular boss portion 24a which contains a coil spring 25 and which is slidingly received within the bore 17b of the plunger 17 which, in turn, compresses the spring 25 into the boss 24a during its movement to a stud-locking position. The cap 24 further includes a pair of flanged ears 24b, partially shown in plan in FIG. 5, positioned on respective sides of the plate 20 which interlock with respective segments of the groove 12h of the member 12. The cap 24 also includes an aperture 24c communicating with the interior of the tubular boss 24a for venting entrapped air and an aligning aperture 24d through which protrudes a cylindrical boss 12k projecting from the cage member 12 to insure proper positioning of the ears 24b.

The coupling 10 further includes a detent button such as a ring-like, dished washer 26 which is disposed about the tubular boss 24a and is urged toward the sear plate 20 by a pyramid-like coil spring 27. The washer 26 has a boss portion 26a which is receivable within the larger aperture 20b of the sear plate 20 for preventing transverse movement of the plate 20 under the action of the spring 21 which would block an excursion of the plunger 17 from release position to lock position.

In operation, referring to FIG. 1, the lock-on stud 14 is inserted through the apertured base 15 and the cap aperture 11b and is used to depress the plunger 17 against the action of the spring 25 so that the chamfered tip 17e depresses the washer 26. Withdrawal of the washer 26 from the aperture 20b allows transverse movement of the plate 20 under the action of spring 21 so that the small aperture 20a is moved into locking engagement with the groove 17c of the plunger 17. As in the coupling disclosed in the above-indicated Eichmann patent, the plunger 17 engages the innermost lip portions of the sprag elements 13 and causes sprag rotation to engage the grooved lock-on stud 14 as is shown in FIG. 2. When release is desired, lanyard 22 is pulled to withdraw the plate 20 from locking engagement with the groove 17c. Simultaneously, the inclined cam surfaces 20d of the camming members 20c urge the chamfered shoulder 17d of the plunger toward the sprag assembly even when the coupling 10 is under load so that the sprag elements 13 may be rotated to a stud-disengaging position under the action of the spring fingers 12e as shown in FIG. 1.

The coupling of FIG. 2 has been shown as sustaining a load under tension. Often it may be desirable to use the coupling 10 in compression load applications such as on a weapons skid. For such applications, it is preferred that the lock-on stud 14 have a bearing shoulder such as 14a fixed thereto at a distance from the end thereof which can bear against the cap 11 and insure that the stud 14 does not cause the plunger 17 to be moved beyond the locking position wherein the apertured plate 20 interlocks with the groove 17c.

It is preferred that the cap 11, the sprag elements 13 and the plunger 17 be made of a metal such as ultra-high-strength steel. It has been found that the cage member 12 and the end cap 24 may be conveniently injection molded from a plastic material such as an acetal resin like "Delrin" made by Du Pont & Co. which has lubricity to facilitate rotation of the sprags 13 and yet is sufficiently flexible and resilient for use in the spring fingers 12e. A convenient tough plastic for the sear plate is a polycarbonate like "Lexan" made by the General Electric Co. The flutes 12f not only reduce the frictional forces on the reciprocable plunger 17 and permit self-aligning of the plunger 17 where there are slight discrepancies in sprag sizes but also facilitate removal of the molded cage member 12 from the mold without stripping off the ring 12d which supports the spring fingers 12a. The ring 12d prevents the individual sprag elements from slipping out of their recesses during assembly of the coupling 10 which may easily be accomplished by unskilled labor. In practice it has been found that a releasable coupling 10 according to the invention capable of supporting in tension a load of 30,000 lbs. may be made which has an overall length of 1½ inches and a diameter of 1⅝ inches and weighs about 8 ounces.

Thus, the invention provides a coupling which can be inexpensively manufactured since portions thereof may be injection molded from plastic materials, since precise milling of components is not required and since the sprag elements 13 need not be formed into an integral bonded annular assembly but can be quickly and individually positioned by unskilled labor in respective sprag receiving recesses formed in the cage member 12. Additionally, the overall length of the coupling has been substantially reduced; and the coupling is actuatable from the side so that a wider range of applications for the coupling is permitted.

It should be understood, of course, that the foregoing disclosure relates only to a preferred embodiment of the invention and that numerous modifications or alterations may be made without departing from the spirit and scope of the invention.

What is claimed is:

1. A coupling for releasably engaging a cylindrical lock-on stud comprising:
   a plurality of sprag elements;
   a sprag cage member having a plurality of spaced-apart projections retaining said sprag elements in an annular arrangement for sprag rotation about an annular axis between stud engaging and stud disengaging positions and having a plurality of cantilever spring fingers operatively connected to said projections for normally urging sprag rotation to said disengaging position.

2. A coupling according to claim 1 wherein:
   said projections are annularly arranged about a bore extending into said cage member, adjacent ones of said projections having parallel confronting surfaces which define together with an intervening surface of said member a recess within which is removably received in contiguous contact therewith a respective sprag element; and
   said spring fingers are connected to said projections adjacent said bore in registry with respective recesses.

3. A coupling according to claim 2 further comprising a ring coaxially fixed adjacent said annular axis of rotation of said sprag elements to the inner lateral peripheries of said projections and having one of the ends of each of said spring fingers fixed thereto.

4. A coupling according to claim 3 wherein said ring and said spring fingers are formed integrally with said projections.

5. A coupling according to claim 3 wherein the inner lateral peripheries of said projections extend radially into said bore and terminate in longitudinally extending flutes formed on the lateral boundary of said bore.

6. A coupling according to claim 5 wherein:
   the bore confronting peripheries of said spring fingers diverge from said ring outwardly of said bore; and
   the inner lateral peripheries of said projections diverge outwardly of said bore from points closer than said ring to a stud receiving end of said bore.

7. A coupling according to claim 2 wherein:
   said sprag elements have circularly curved body portions;
   the outer lateral peripheries of said projections are convex, circularly curved surfaces; and
   said intervening surfaces are concave, circularly curved surfaces;
   the radii of curvatures of said convex and concave surfaces and said sprag body portions being the same.

8. A coupling according to claim 2 wherein the bore confronting peripheries of said spring fingers diverge outwardly of said bore from their points of connection to said projections.

9. A coupling according to claim 2 further comprising:
   a cylindrical plunger having a first elongated annular groove and a second spaced-apart annular groove formed in its lateral periphery and slidingly received within said bore of said cage member for movement to actuate sprag rotation to said engaging position; and
   a plate connected to said member for sliding movement transversely of said bore of said member and in the path of said second groove of said plunger moved to actuate sprag rotation to said engaging position, said plate having formed therethrough a first aperture sized for receiving therein in a first position a portion of said plunger and a second aperture aligned and contiguous with said first aperture and having a smaller size for interlockingly engaging in a second position said second groove of said plunger.

10. A coupling according to claim 9 further comprising camming means connected to said plate adjacent said first aperture for camming said plunger through movement permitting sprag rotation from said engaging position.

11. A coupling according to claim 9 further comprising:
   a detent member aligned with said plunger and having a portion receivable within said first aperture of said plate registering therewith and movable therefrom by said plunger;
   first spring means arranged for normally urging said portion of said detent member into said first aperture; and
   second spring means arranged for normally urging said plate to move from said first position to said second position.

12. A coupling according to claim 11 further comprising:
   a cap connected to said cage member and having a tubular boss portion receivable within said bore of said cage member through said apertures in said plate; and
   a third spring means received within said tubular boss portion for normally urging said plunger away from said cap permitting sprag rotation from said engaging position;
   said plunger having a coaxial bore extending thereinto from an end adjacent said second groove for receiving therewithin said boss portion and compressing said third spring into said boss portion.

13. A coupling according to claim 12 further comprising camming means connected to said plate adjacent said first aperture for camming said plunger through movement permitting sprag rotation from said engaging position.

References Cited

UNITED STATES PATENTS

| | | | |
|---|---|---|---|
| 1,820,703 | 8/1931 | Hungerford | 287—119 |
| 2,448,817 | 9/1948 | McArthur | 287—20.5 |
| 2,598,758 | 6/1952 | Byram | 287—119 |
| 3,043,614 | 7/1962 | Eichmann | 24—211 |

CARL W. TOMLIN, Primary Examiner

WAYNE L. SHEDD, Assistant Examiner

U.S. Cl. X.R.

24—230.1